US012731795B2

(12) United States Patent
Radhakrishnan et al.

(10) Patent No.: US 12,731,795 B2
(45) Date of Patent: Sep. 8, 2026

(54) FUEL CELL INTERCONNECT ALLOYED WITH TRANSITION METAL ELEMENT AND METHOD OF MAKING THEREOF

(71) Applicant: BLOOM ENERGY CORPORATION, San Jose, CA (US)

(72) Inventors: Vijay Radhakrishnan, Mumbai (IN); Tad Armstrong, San Jose, CA (US); Mosur K. Premkumar, Mumbai (IN)

(73) Assignee: BLOOM ENERGY CORPORATION, San Jose, CA (US)

( * ) Notice: Subject to any disclaimer, the term of this patent is extended or adjusted under 35 U.S.C. 154(b) by 672 days.

(21) Appl. No.: 18/167,314

(22) Filed: Feb. 10, 2023

(65) Prior Publication Data

US 2023/0268519 A1 Aug. 24, 2023

(30) Foreign Application Priority Data

Feb. 18, 2022 (IN) ............................ 202241008702

(51) Int. Cl.

| | |
|---|---|
| ***H01M 8/021*** | (2016.01) |
| ***B22F 1/00*** | (2022.01) |
| ***B22F 7/06*** | (2006.01) |
| ***C22C 38/04*** | (2006.01) |
| ***C22C 38/10*** | (2006.01) |
| ***C22C 38/16*** | (2006.01) |
| ***H01M 8/0228*** | (2016.01) |
| ***H01M 8/0258*** | (2016.01) |
| ***H01M 8/2425*** | (2016.01) |

(52) U.S. Cl.

CPC ............... *H01M 8/021* (2013.01); *B22F 1/09* (2022.01); *B22F 7/062* (2013.01); *C22C 38/04* (2013.01); *C22C 38/10* (2013.01); *C22C 38/16* (2013.01); *H01M 8/0228* (2013.01); *H01M 8/0258* (2013.01); *H01M 8/2425* (2013.01); *B22F 2301/20* (2013.01); *B22F 2301/35* (2013.01); *B22F 2998/10* (2013.01); *B22F 2999/00* (2013.01)

(58) Field of Classification Search

None

See application file for complete search history.

(56) References Cited

U.S. PATENT DOCUMENTS

| | | | |
|---|---|---|---|
| 8,840,833 | B1 | 9/2014 | Janousek et al. |
| 9,434,003 | B2 | 9/2016 | Zobl et al. |

(Continued)

FOREIGN PATENT DOCUMENTS

| | | | |
|---|---|---|---|
| TW | 201334278 | A | 8/2013 |
| TW | 202012655 | A | 4/2020 |

(Continued)

OTHER PUBLICATIONS

Extended European Search Report for Patent Application No. 23155945.1, mailed Jul. 28, 2023, 7 pages.

(Continued)

*Primary Examiner* — Colin W. Slifka

(74) *Attorney, Agent, or Firm* — THE MARBURY LAW GROUP PLLC

(57) ABSTRACT

A method of making an interconnect for a fuel cell stack includes compressing an interconnect powder to form an interconnect, the interconnect power containing Cr, Fe and at least one transition metal selected from Co, Cu, Mn, Ni, or V pre-alloyed with at least one of the Cr and the Fe, and sintering the interconnect.

18 Claims, 3 Drawing Sheets

(56) References Cited

U.S. PATENT DOCUMENTS

| | | | |
|---|---|---|---|
| 9,452,475 | B2 | 9/2016 | Armstrong et al. |
| 9,634,335 | B2 | 4/2017 | Ashary |
| 10,079,393 | B1 | 9/2018 | Verma et al. |
| 10,431,833 | B2 | 10/2019 | Wilson et al. |
| 10,553,879 | B2 | 2/2020 | El Batawi et al. |
| 2013/0129557 | A1 | 5/2013 | Herchen et al. |
| 2013/0230644 | A1 | 9/2013 | Armstrong et al. |
| 2013/0230792 | A1 | 9/2013 | Wilson et al. |
| 2015/0194682 | A1 | 7/2015 | Ashary |
| 2015/0221957 | A1 | 8/2015 | Herchen et al. |
| 2015/0244004 | A1 | 8/2015 | Shivanath et al. |
| 2019/0372132 | A1 | 12/2019 | Gasda et al. |

FOREIGN PATENT DOCUMENTS

| | | | |
|---|---|---|---|
| TW | 202025544 | A | 7/2020 |
| TW | 20114280 | A | 4/2021 |

OTHER PUBLICATIONS

IPO Office Communication and Search Report for ROC (Taiwan) Patent Application No. 112104720, mailed Apr. 8, 2026, 10 pages, including English translation of Search Report.

FUEL CELL INTERCONNECT ALLOYED WITH TRANSITION METAL ELEMENT AND METHOD OF MAKING THEREOF

FIELD

The present invention is directed to fuel cell stack components, specifically to interconnects and methods of making interconnects for fuel cell stacks.

BACKGROUND

A typical solid oxide fuel cell stack includes multiple fuel cells separated by metallic interconnects (IC) which provide both electrical connection between adjacent cells in the stack and channels for delivery and removal of fuel and oxidant. The metallic interconnects are commonly composed of a Cr-based alloys such as CrFe alloys, which have a composition of 95 wt % Cr-5 wt % Fe or Cr—Fe—Y having a 94 wt % Cr-5 wt % Fe-1 wt % Y composition. The CrFe and CrFeY alloys retain their strength and are dimensionally stable at typical solid oxide fuel cell (SOFC) operating conditions, e.g. 700-900° C. in both air and wet fuel atmospheres. However, during operation of the SOFCs, chromium in the CrFe or CrFeY alloys react with oxygen and form chromia, resulting in degradation of the SOFC stack.

SUMMARY

Various embodiments provide a method of making an interconnect for fuel cell stack, the method including compressing an interconnect powder to form an interconnect, the interconnect power comprising Cr, Fe and at least one transition metal selected from Co, Cu, Mn, Ni, or V pre-alloyed with at least one of the Cr or the Fe, and sintering the interconnect.

Various embodiments provide a method of forming an interconnect for a fuel cell stack, comprising compressing an interconnect powder to form an interconnect, the interconnect power comprising Cr powder particles, Fe powder particles and at least one transition metal shell selected from Co, Cu, Mn, Ni, or V coating at least one of the Cr or the Fe particles, and sintering the interconnect.

Various embodiments provide an interconnect for a fuel cell stack, comprising an interconnect body comprising a chromium based alloy containing iron and at least one transition metal selected from Co, Cu, Mn, Ni, or V, the interconnect body comprising fuel flow channels separated by fuel ribs on a fuel side and air flow channels separated by air ribs on an air side, a protective coating comprising an oxide of at least one of Mn or Co located over the air side of the interconnect body, and a chromium-transition metal oxide spinel interfacial layer located between the air side of the interconnect body and the protective coating.

DETAILED DESCRIPTION

The various embodiments will be described in detail with reference to the accompanying drawings. The drawings are not necessarily to scale, and are intended to illustrate various features of the invention. Wherever possible, the same reference numbers will be used throughout the drawings to refer to the same or like parts. References made to particular examples and implementations are for illustrative purposes, and are not intended to limit the scope of the invention or the claims.

Ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X. It will be further understood that the endpoints of each of the ranges are significant both in relation to the other endpoint, and independently of the other endpoint.

Figure 1A:
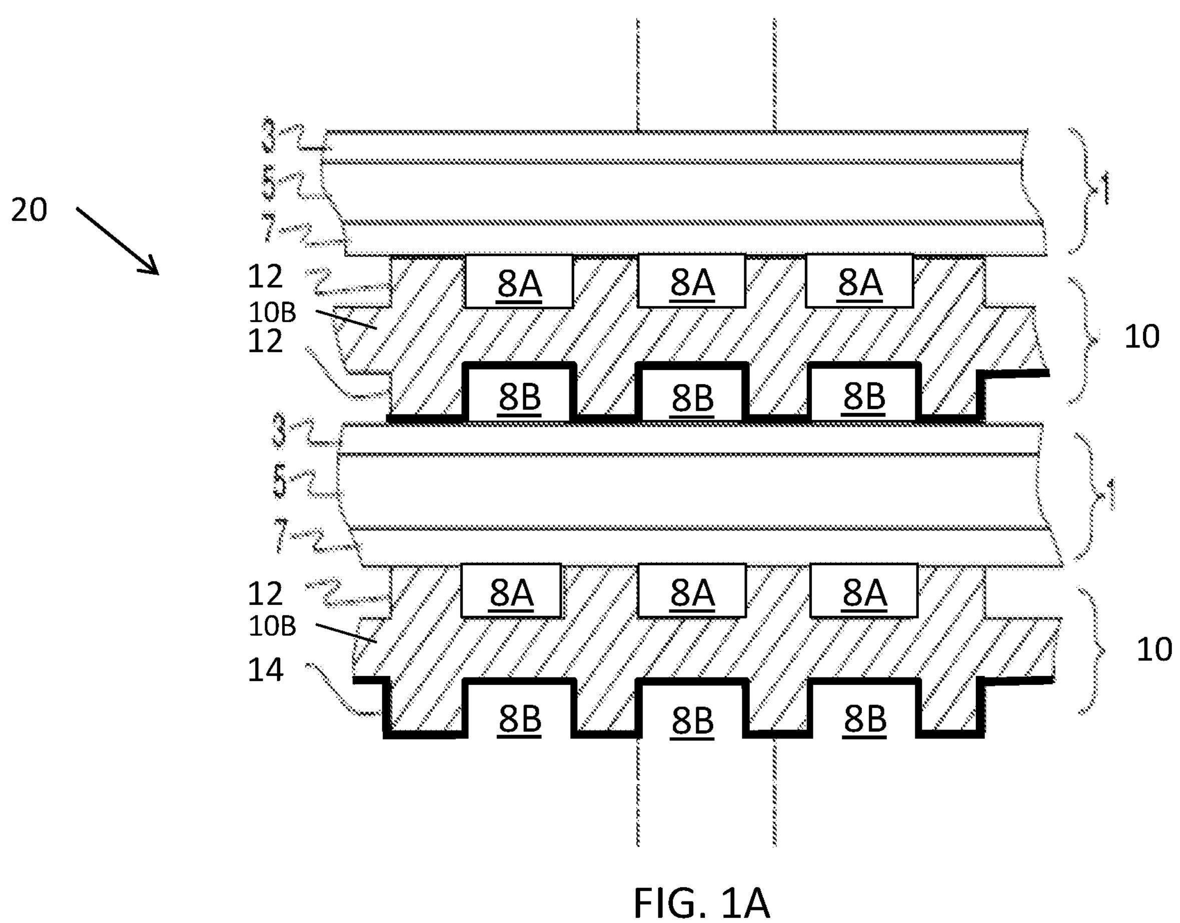
FIG. 1A is a sectional view of a portion of a solid oxide fuel cell (SOFC) stack, according to various embodiments of the present disclosure.
Figure 1B:
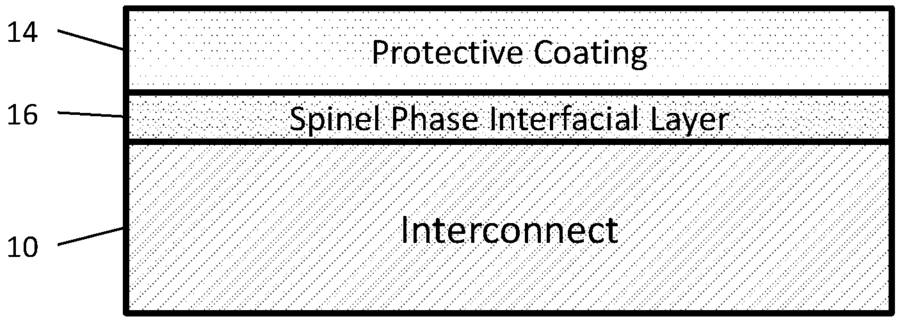
FIG. 1B schematic side view of an interconnect of FIG. 1A.
Figures 1C, 1D:
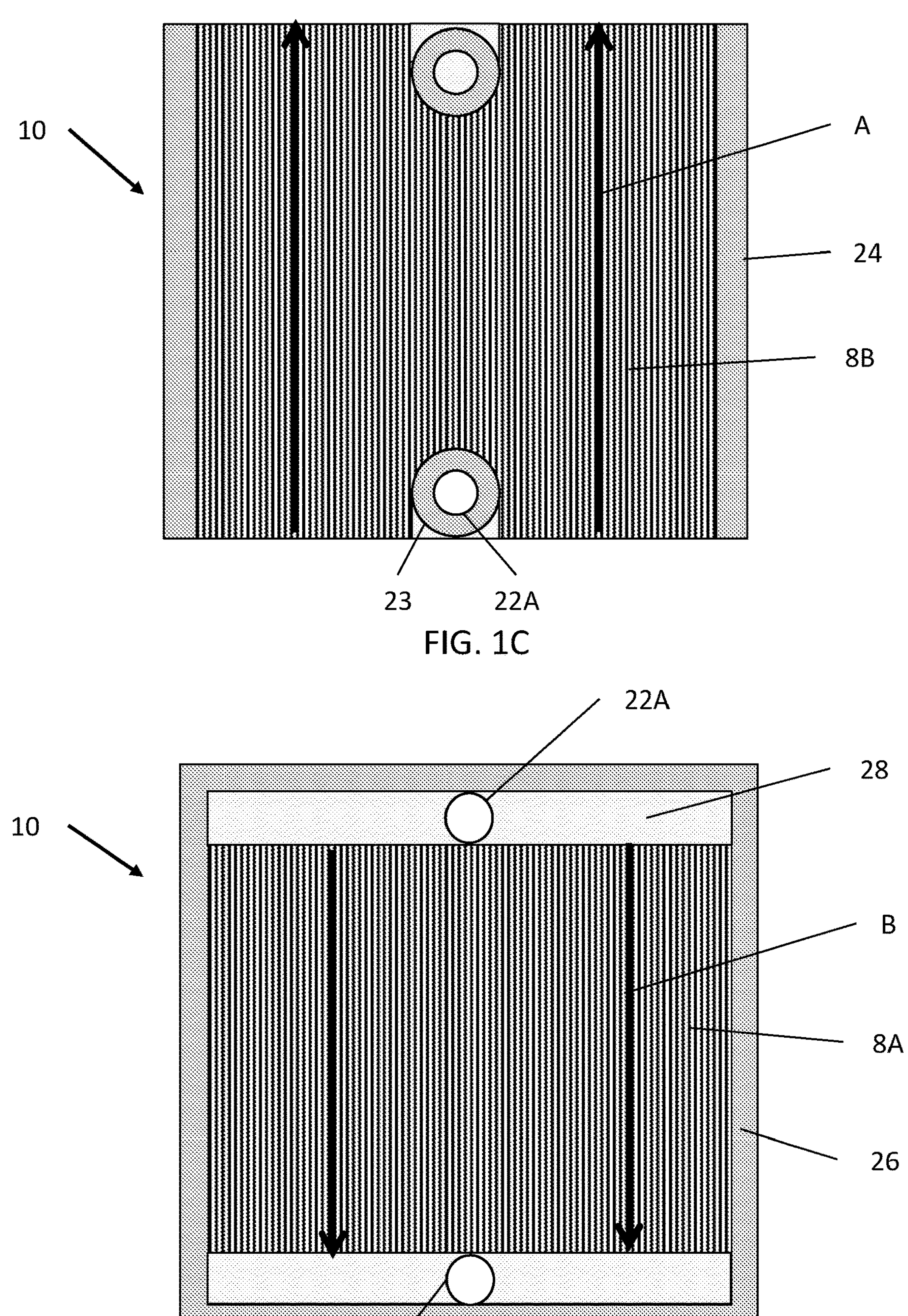
FIG. 1C is a top view of the air side of an interconnect of FIG. 1A.
FIG. 1D is a top view of a fuel side of an interconnect of FIG. 1A

FIG. 1A is a sectional view of a portion of a solid oxide fuel cell (SOFC) stack 20, according to various embodiments of the present disclosure, FIG. 1B schematic side view of an interconnect 10 of FIG. 1A, FIG. 1C is a top view of the air side of an interconnect 10 of FIG. 1A, and FIG. 1D is a top view of a fuel side of the interconnect 10.

Referring to FIGS. 1A-1D, the stack 20 includes multiple fuel cells 1 that are separated by interconnects 10, which may also be referred to as gas flow separator plates or bipolar plates. Each fuel cell 1 includes a cathode electrode 3, a solid oxide electrolyte 5, and an anode electrode 7.

Each interconnect 10 electrically connects adjacent fuel cells 1 in the stack 20. In particular, an interconnect 10 may electrically connect the anode electrode 7 of one fuel cell 1 to the cathode electrode 3 of an adjacent fuel cell 1.

Each interconnect 10 includes ribs 12 that at least partially define fuel channels 8A and air channels 8B. The interconnect 10 may operate as a gas-fuel separator that separates a fuel, such as a hydrocarbon or hydrogen fuel, flowing to the fuel electrode (i.e. anode 7) of one cell in the stack from oxidant, such as air, flowing to the air electrode (i.e. cathode 3) of an adjacent cell in the stack. At either end of the stack 20, there may be an air end plate or fuel end plate (not shown) for providing air or fuel, respectively, to the end electrode.

Air flows through the air channels 8B to a cathode electrode 3 of an adjacent fuel cell 1. In particular, the air may flow across the interconnect 10 in a first direction A as indicated by the arrows of FIG. 1C.

Ring seals 23 may surround fuel holes 22A of the interconnect 10, to prevent fuel from contacting the cathode electrode. Peripheral strip-shaped seals 24 are located on peripheral portions of the air side of the interconnect 10. The seals 23, 24 may be formed of a glass or glass-ceramic material. The peripheral portions of the interconnect 10 may be in the form of an elevated plateau which does not include ribs or channels. The surface of the peripheral regions may be coplanar with tops of the ribs 12.

As shown in FIG. 1D, the fuel side of the interconnect 10 may include the fuel channels 8A and fuel manifolds 28

(e.g., fuel plenums). Fuel flows from one of the fuel holes 22A, into the adjacent manifold 28, through the fuel channels 8A, and to an anode 7 of an adjacent fuel cell 1. Excess fuel may flow into the other fuel manifold 28 and then into the adjacent fuel hole 22A. In particular, the fuel may flow across the interconnect 10 in a second direction B, as indicated by the arrows.

A frame-shaped seal 26 is disposed on a peripheral region of the fuel side of the interconnect 10. The peripheral region may be an elevated plateau which does not include ribs or channels. The surface of the peripheral region may be coplanar with tops of the ribs 12.

The interconnect 10 shown in FIGS. 1C and 1D is externally manifolded for air and internally manifolded for fuel. The air and fuel flow in counter-flow (i.e., opposite directions) across the air and fuel sides of the interconnect 10. Other interconnect configurations may also be used. In alternative embodiments, co-flow or cross-flow interconnect configurations may be used, such as for example, a cross-flow interconnect described in U.S. Patent Application Publication Number 2019/0372132 A1, incorporated herein by reference in its entirety. Furthermore, the interconnects may be internally manifolded for air and/or externally manifolded for fuel.

Interconnects are typically made from a Cr-based alloys such as CrFe alloys, which have a composition of 93-97 wt. % Cr and 3-7 wt. % Fe (e.g., 95 wt. % Cr and 5 wt. % Fe) or CrFeY alloys having a 94 wt. % Cr, 5 wt. % Fe and 1 wt. % Y composition. The CrFe and CrFeY alloys retain their strength and are dimensionally stable at typical solid oxide fuel cell (SOFC) operating conditions, e.g. 700-900° C. in both air and wet fuel atmospheres.

However, during operation in a stack, the chromium in interconnects formed of CrFe and CrFeY alloys may react with oxygen in air and form a chromium oxide (chromia, $Cr_2O_3$) layer on air-sides of the interconnects. Water in the air may also react with the chromia layer to form gaseous phases such as $CrO_2(OH)_2$ that diffuse into fuel cell cathodes and decrease the electrochemical activity of the cathodes. In addition, the high resistivity of the chromia layer on the surface of the interconnects increases the ohmic resistance of the interconnects, which increases the area specific resistance (ASR) of the stack over time, resulting in performance degradation.

For example, chromia formation may result in higher stack ohmic resistance due to the formation of native chromia on the interconnect. The chromia layer may grow in thickness on the surfaces of the interconnects over time. Thus, the ohmic resistance of the interconnects increases over time due to this chromia layer. Furthermore, chromium containing gaseous phase evaporation may result in chromium poisoning of the cathodes 3. Typical SOFC cathode materials, such as perovskite materials, (e.g., LSM, LSC, LSCF, and LSF) are particularly vulnerable to chromium poisoning.

In some embodiments, the air-side surface of the interconnects 10 may be coated with a protective coating 14 (see FIG. 1A), in order to decrease the growth rate of the chromium oxide on the surface of the interconnects 10 and to suppress evaporation of chromium vapor species which can poison the fuel cell cathodes 3. However, in some embodiments the protective coating 14 may be formed on both the air-side and the fuel side of the interconnects 10. The protective coating 14 may be formed using a spray coating process, such as plasma spraying, or a dip coating process.

Typically, the protective coating 14 may comprise a perovskite material such as lanthanum strontium manganite (LSM). Alternatively, other metal oxide spinel materials, such as a $(Mn, Co)_3O_4$ spinel materials, can be used instead of or in addition to LSM. Any spinel having the composition $Mn_{2-x}Co_{1+x}O_4$ ($0 \le x \le 1$) or written as $z(Mn_3O_4)+(1-z)(Co_3O_4)$, where ($1/3 \le z \le 2/3$) or written as $(Mn, Co)_3O_4$ may be used. Many of the spinels that contain transition metals exhibit good electrical conductivities and reasonably low anion and cation diffusivities and are therefore suitable coating materials.

However, the present inventors determined that the protective coating 14 alone may not be sufficient to prevent the ASR degradation due to chromia accumulation on the interconnects 10 and/or cathode chromium poisoning.

Accordingly, in various embodiments, a transition metal alloying element is added to the interconnects 10 prior to forming the protective coatings 14, in order to facilitate the formation of a chromium-transition metal oxide spinel phase interfacial layer 16 between the protective coating 14 and the interconnect 10, as shown in FIG. 1B. Alloying elements may be transition metal elements that form a binary or ternary spinel material with Cr and that have a higher octahederal site occupancy preference as compared to Cr. For example, transition metal alloying elements in the interconnect 10, such as Mn, Co, Ni, Cu, and/or V, may promote the formation of the chromium-transition metal oxide spinel phase interfacial layer 16, in place of or in addition to the native chromia phase interfacial layer formed on the surface of the interconnect 10, during operation in a fuel cell stack. Such chromium-transition metal oxide spinel phases may provide reduced Cr evaporation and increased electrical conductivity, as compared to native chromia phases.

Chromium containing spinel materials have the general formula $Cr_xM_{3-x}O_4$, where $1 \le x \le 2$ and M comprises at least one of Mn, Co, Ni, Cu, or V. In general, the electrical conductivity of the spinel phases is higher if a transition metal atom, such as Mn, Co, Ni, Cu, and/or V, occupies the octahedral position in the resulting spinel phase, rather than Cr.

For example, Mn reacts with $Cr_2O_3$ to form $(Mn, Cr)_3O_4$ type spinel phases having compositions ranging between $MnCr_2O_4$ and $Mn_2CrO_4$, with typical compositions of $Mn_{1.5}Cr_{1.5}O_4$, $Mn_{1.3}Cr_{1.7}O_4$ and $Mn_{1.7}Cr_{1.3}O_4$. These spinel oxide phases have substantially higher electrical conductivity and lower chromium evaporation, as compared to $Cr_2O_3$. For example, these spinel phases may have electrical conductivities that are more than 10 times greater than the electrical conductivity of chromia. Furthermore, these spinel phases may have reduced Cr diffusion rates, as compared to chromia, which may significantly lower the rate of Cr evaporation.

For example, addition of Mn to a Cr—Fe alloy interconnect material may promote the formation of a $(Fe, Mn, Cr)_3O_4$ spinel phase interfacial layer 16, wherein the elemental site preference may be determined by composition, temperature, and oxygen partial pressure ($pO_2$) of an atmosphere during the formation thereof. Example spinel materials may include $NiCr_2O_4$ of the $(Ni,Cr)_3O_4$ family, $CoCr_2O_4$ of the $(Co,Cr)_3O_4$ family, and $CuCr_2O_4$ of the $(Cu, Cr)_3O_4$ family One or more additional alloying elements may be included to promote the formation of other spinel phases, such as $(Mn, Co, Cr)_3O_4$, $(Cu, Mn, Cr)_3O_4$, $(Ni, Cu, Cr)_3O_4$, and $(Mn, Ni, Co, Cr)_3O_4$, wherein some of the additional alloying elements partially occupy the octahedral positions of the spinel phase.

Various embodiments provide an interconnect 10 for a fuel cell stack 20, comprising an interconnect body 10B comprising a chromium based alloy containing iron and at least one transition metal selected from Co, Cu, Mn, Ni, or V, the interconnect body 10B comprising fuel flow channels 8A separated by fuel ribs 12 on a fuel side, and air flow channels 8B separated by air ribs 12 on an air side, a protective coating 16 comprising an oxide of at least one of Mn or Co located over the air side of the interconnect body 10B, and a chromium-transition metal oxide spinel interfacial layer 16 located between the air side of the interconnect body 10B and the protective coating 14.

In one embodiment, the chromium-transition metal oxide spinel interfacial layer 16 comprises an oxide of chromium and at least one of Co, Cu, Mn, Ni, or V. The protective coating 14 comprises at least one of lanthanum strontium manganite or a (Mn, Co)$_3$O$_4$ spinel coating.

Interconnect Formation

According to various embodiments, interconnects may be formed by powder metallurgy which includes pressing an interconnect powder including at least one transition metal powder, Cr and Fe, in a hydraulic or mechanical press to produce a part having the desired interconnect shape. The interconnect powder may also include an organic lubricant/binder and when pressed using a powder metallurgy technique, forms so-called "green parts". The "green parts" have substantially the same size and shape as the finished interconnect (i.e., "near net shape"). The lubricant/binder in the green parts may be removed before the parts are sintered. For example, the lubricant/binder may be removed in a debinding process in a furnace at a temperature of 200° C. to 800° C. After debinding, the compressed powder interconnects may be sintered at high-temperature (e.g., 1350-1600° C.), in a reducing atmosphere, to promote metal interdiffusion. The interconnects may undergo a separate controlled oxidation treatment, such as by exposing the interconnects to an oxidizing ambient, such as air, at a high temperature after sintering and prior to use of the interconnects in the stack. A protective layer may be applied after the sintering of an interconnect.

The incorporation of transition metals, such as Co, Mn, V, Ni, and/or Cu, into a powder metallurgy process used to form the interconnect may suffer from various challenges. For example, if a transition metal elemental powder is mixed with Cr and Fe elemental powders, and the resultant interconnect powder is pressed to a desired shape, the high vapor pressure of the transition elements may result in significant loss of material during high-temperature sintering of the interconnect. Secondly, the low melting temperature of some transition metal elements can result in loss of material and contamination of furnace furniture. Herein, "elemental" powders refer to powders that do not comprise alloyed elements (i.e., pure Co, Cu, Mn, Ni, or V powders).

According to various embodiments, interconnects may be formed by powder metallurgy using an interconnect powder that includes a powder comprising Fe and/or Cr pre-alloyed with one or more transition metals, such as Co, Cu, Mn, Ni, and/or V. For example, the interconnect powder may be formed by mixing a Cr elemental powder and a pre-alloyed transition metal-Fe powder. In some embodiments, the interconnect powder may include, by weight, from about from about 5% to about 15% pre-alloyed transition metal-Fe powder and from about 95% to about 85% of an elemental Cr powder. In the alternative, an interconnect powder may include an elemental Fe powder mixed with a pre-alloyed transition metal-Cr alloy powder.

The ratio of the metals in the pre-alloyed powders may be tailored to promote the formation of the desired spinel phase (e.g., during SOFC operation), while lowering the evaporation rate of the materials during powder metallurgy processing. Suitable pre-alloyed Fe powders may include Co—Fe, Mn—Fe, V—Fe, and Ni—Fe. Suitable pre-alloyed Cr powders including Co—Cr, Mn—Cr, V—Cr, and Ni—Cr. In some embodiments, pre-alloyed powders may include ternary alloys, such as Co—Mn—Fe and Cu—Ni—Fe, for example.

In various embodiments, a Mn—Fe alloy powder may include, by weight, from about 5% to about 35% Mn and from about 65% to about 95% Fe, such as from about 10% to about 30% Mn and from about 70% to about 90% Fe. A Cu—Fe alloy powder may include, by weight, from about 15% to about 25% Cu and from about 75% to about 85% Fe, such as about 20% Cu and about 80% Fe. A Co—Fe alloy powder may include, by weight, from about 35% to about 45% Co and from about 55% to about 65% Fe, such as about 40% Co and 60% Fe.

The pre-alloying of transition metals may unexpectedly lower the activity of the transition metals, which thereby lowers the vapor pressure and/or increases the melting temperature of the alloyed transition metal. For example, the alloying of Mn with Fe lowers the activity of the Mn, and thus, lowers the vapor pressure of the Mn and reduces evaporation during subsequent high-temperature sintering. Likewise, alloying Cu with Fe significantly increases the melting temperature of the Cu, thereby reducing problems associated with liquid phases.

Figure 2:
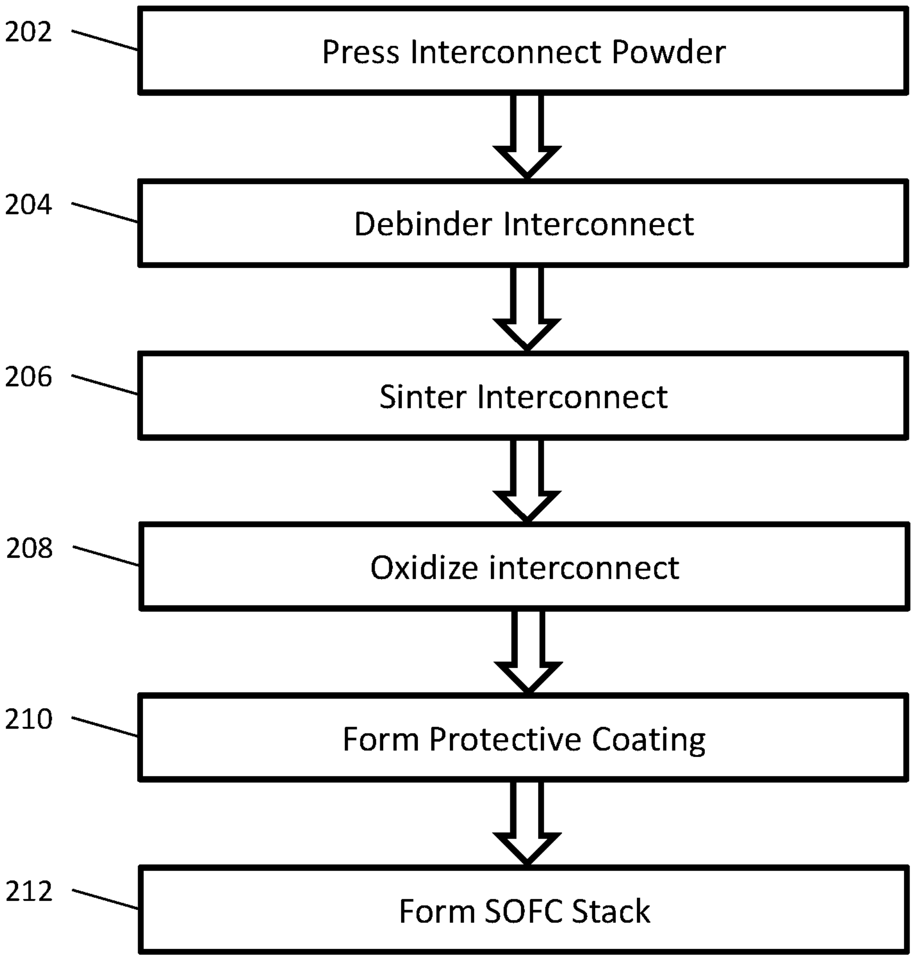
FIG. 2 is flow diagram illustrating a method of forming an interconnect, according to various embodiments of the present disclosure.

FIG. 2 is a flow diagram illustrating a method of forming an interconnect, according to various embodiments of the present disclosure. Referring to FIG. 2, in step 202, an interconnect powder may be loaded into a die between an upper punch and a lower punch of a hydraulic or mechanical press and compacted under high pressure to form a green interconnect.

The interconnect powder may include Cr, Fe, and one or more pre-alloyed transition metals, such as Co, Mn, V, Ni, and/or Cu as described above. For example, a pre-alloyed transition metal-Fe powder may be mixed with a Cr elemental powder to form the interconnect powder. In the alternative, a pre-alloyed transition metal-Cr powder may be mixed with a Fe elemental powder to form the interconnect powder. In some embodiments, the interconnect powder may also include an organic lubricant/binder.

In various embodiments, the transition metal-Fe powder and/or the transition metal-Cr powder may be formed by coating a Fe elemental powder, a Cr elemental powder, or a mixture thereof, with at least one transition metal. In particular, one or both of the elemental powders may be coated using an electroless plating process, a solution deposition process, or a sol-gel process. For example, an elemental powder may be wetted by a solution comprising transition metal precursors, dried, and reacted at an appropriate temperature and atmosphere, to form a transition metal coated Cr or Fe powder. The coated powders may have a core-shell structure, including a Cr or Fe core covered by a transition metal shell. The coated powder (e.g., Fe core with a transition metal shell) may be mixed with an elemental powder (e.g., Cr powder) to form the interconnect powder.

In the above embodiments in which the powder containing the transition metal element is evenly distributed throughout the die cavity, a concentration of the at least one transition metal selected from Co, Cu, Mn, Ni, or V is substantially the same from the air side of the interconnect 10 to the fuel side of the interconnect 10 after the pressing and sintering.

In an alternative embodiment, step 202 may alternatively include loading a Cr elemental powder, a Fe elemental powder, and a transition metal alloy powder in the die cavity using a graded filling process. In particular, a layer of the transition metal alloy powder may be loaded at the top or bottom of the die cavity, and a remainder of the die may be filled with a mixture of elemental Fe and Cr powders. As such, the transition metal alloy powder may be localized on one side of the resultant pressed interconnect, such as on an air-side of the interconnect. In this embodiment, a concentration of the at least one transition metal selected from Co, Cu, Mn, Ni, or V is higher on the air side of the interconnect than on the fuel side of the interconnect.

In step 204, the green interconnect may be removed from the press, loaded into a furnace, and heated at a temperature ranging from about 200° C. to about 800° C., to remove organic component such as the lubricant/binder.

In step 206, the interconnect may be sintered at a high-temperature, such as a temperature ranging from about 1350° C. to about 1600° C., in a reducing atmosphere (e.g., forming gas or $H_2$ atmosphere), to promote metal interdiffusion.

In step 208, the interconnect may be oxidized by heating the interconnect at a controlled oxidation treatment, such as by exposing the interconnect to an oxidizing ambient, such as air, at a high temperature. The oxidation may operate to reduce the porosity of the interconnect. A surface oxide may be removed by grit blasting or other methods.

In step 210, the protective coating 14 may be formed on at least one side of the interconnect 10. For example, the protective coating may be formed by applying a perovskite and/or spinel material, such as LSM and/or MCO on the sintered interconnect using an air plasma spray (APS) spray process or a dip coating process, for example. The air plasma spray process is a thermal spray process in which powdered coating materials are fed into the coating apparatus. The coating particles are introduced into a plasma jet in which they are melted and then accelerated toward the substrate. On reaching the substrate, the molten droplets flatten and cool, forming the coating. The plasma may be generated by either direct current (DC plasma) or by induction (RF plasma). Further, unlike controlled atmosphere plasma spraying (CAPS) which requires an inert gas or vacuum, air plasma spraying is performed in ambient air.

In step 212, interconnects may be assembled with fuel cells 1 and other stack components to form the fuel cell stack 20. Operation of the stack may result in the formation of chromium-transition metal oxide spinel layers 16 between the interconnect 10 and the protective coating 14 on air sides of the interconnects.

In other embodiments, step 202 may alternatively include pressing an interconnect powder that comprises Fe and Cr elemental powders and that does not comprise a pre-alloyed powder. The method may additionally include enriching the surface of the interconnect with a transition metal alloy, before or after the sintering of step 206. For example, a Fe or Cr-transition metal alloy may be applied to the surface of the interconnect by a deposition technique, such as electroplating, plasma vapor deposition (PVD), chemical vapor deposition (CVD), or spray coating.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. An interconnect for a fuel cell stack, comprising:

an interconnect body comprising a chromium based alloy containing iron and at least one transition metal selected from Co, Cu, Mn, Ni, or V, the interconnect body comprising fuel flow channels separated by fuel ribs on a fuel side and air flow channels separated by air ribs on an air side;

a protective coating comprising an oxide of at least one of Mn or Co located over the air side of the interconnect body; and a chromium-transition metal oxide spinel interfacial layer located between the air side of the interconnect body and the protective coating, wherein a concentration of the at least one transition metal selected from Co, Cu, Mn, Ni, or V is higher on the air side of the interconnect body than on the fuel side of the interconnect body.

2. The interconnect of claim 1, wherein the chromium-transition metal oxide spinel interfacial layer comprises an oxide of chromium and at least one of Co, Cu, Mn, Ni, or V.

3. The interconnect of claim 2, wherein the protective coating comprises at least one of lanthanum strontium manganite or a $(Mn, Co)_3O_4$ spinel coating.

4. The interconnect of claim 3, wherein the protective coating comprises the lanthanum strontium manganite coating.

5. The interconnect of claim 3, wherein the protective coating comprises the $(Mn, Co)_3O_4$ spinel coating.

6. The interconnect of claim 3, wherein the protective coating comprises the lanthanum strontium manganite coating and the $(Mn, Co)_3O_4$ spinel coating.

7. The interconnect of claim 1, wherein the at least one transition metal selected from Co, Cu, Mn, Ni, or V comprises cobalt.

8. The interconnect of claim 7, wherein the chromium-transition metal oxide spinel interfacial layer comprises the oxide of the chromium and the cobalt.

9. The interconnect of claim 1, wherein the at least one transition metal selected from Co, Cu, Mn, Ni, or V comprises copper.

10. The interconnect of claim 9, wherein the chromium-transition metal oxide spinel interfacial layer comprises the oxide of the chromium and the copper.

11. The interconnect of claim 1, wherein the at least one transition metal selected from Co, Cu, Mn, Ni, or V comprises manganese.

12. The interconnect of claim 11, wherein the chromium-transition metal oxide spinel interfacial layer comprises the oxide of the chromium and the manganese.

13. The interconnect of claim 1, wherein the at least one transition metal selected from Co, Cu, Mn, Ni, or V comprises nickel.

14. The interconnect of claim 13, wherein the chromium-transition metal oxide spinel interfacial layer comprises the oxide of the chromium and the nickel.

15. The interconnect of claim 1, wherein the at least one transition metal selected from Co, Cu, Mn, Ni, or V comprises vanadium.

16. The interconnect of claim 15, wherein the chromium-transition metal oxide spinel interfacial layer comprises the oxide of the chromium and the vanadium.

17. The interconnect of claim 1, wherein the interconnect contains 93 to 97 weight percent chromium.

18. A solid oxide fuel cell stack, comprising:

a plurality of interconnects of claim 1; and a plurality of solid oxide fuel cells.

* * * * *